Nov. 20, 1951 W. E. THORNTON-TRUMP 2,575,369
TRACTOR MOUNTED RECIPROCATING MOWER
Filed Dec. 29, 1948 2 SHEETS—SHEET 1
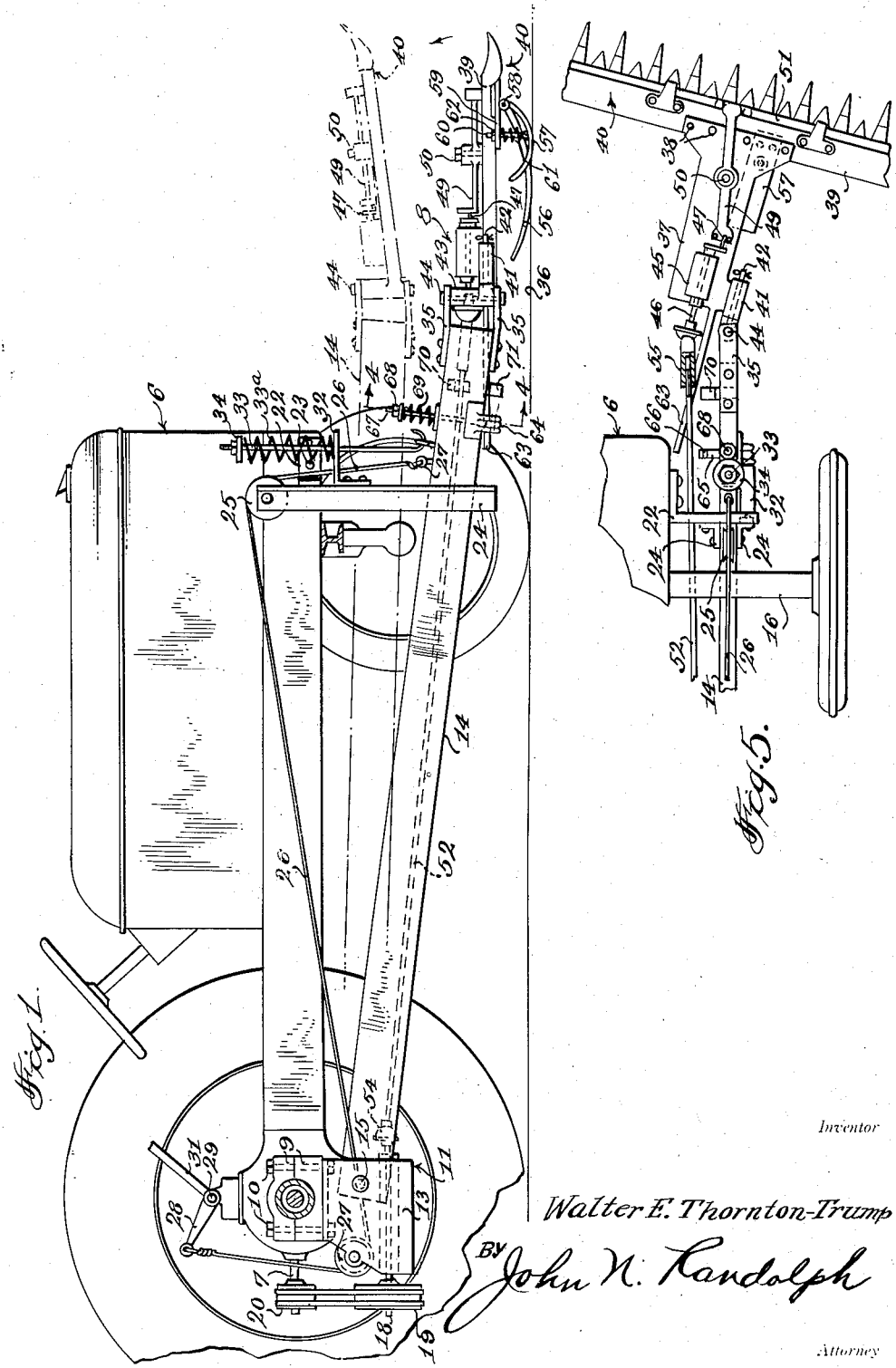
Inventor
Walter E. Thornton-Trump
By John N. Randolph
Attorney Nov. 20, 1951    W. E. THORNTON-TRUMP    2,575,369
TRACTOR MOUNTED RECIPROCATING MOWER
Filed Dec. 29, 1948    2 SHEETS—SHEET 2
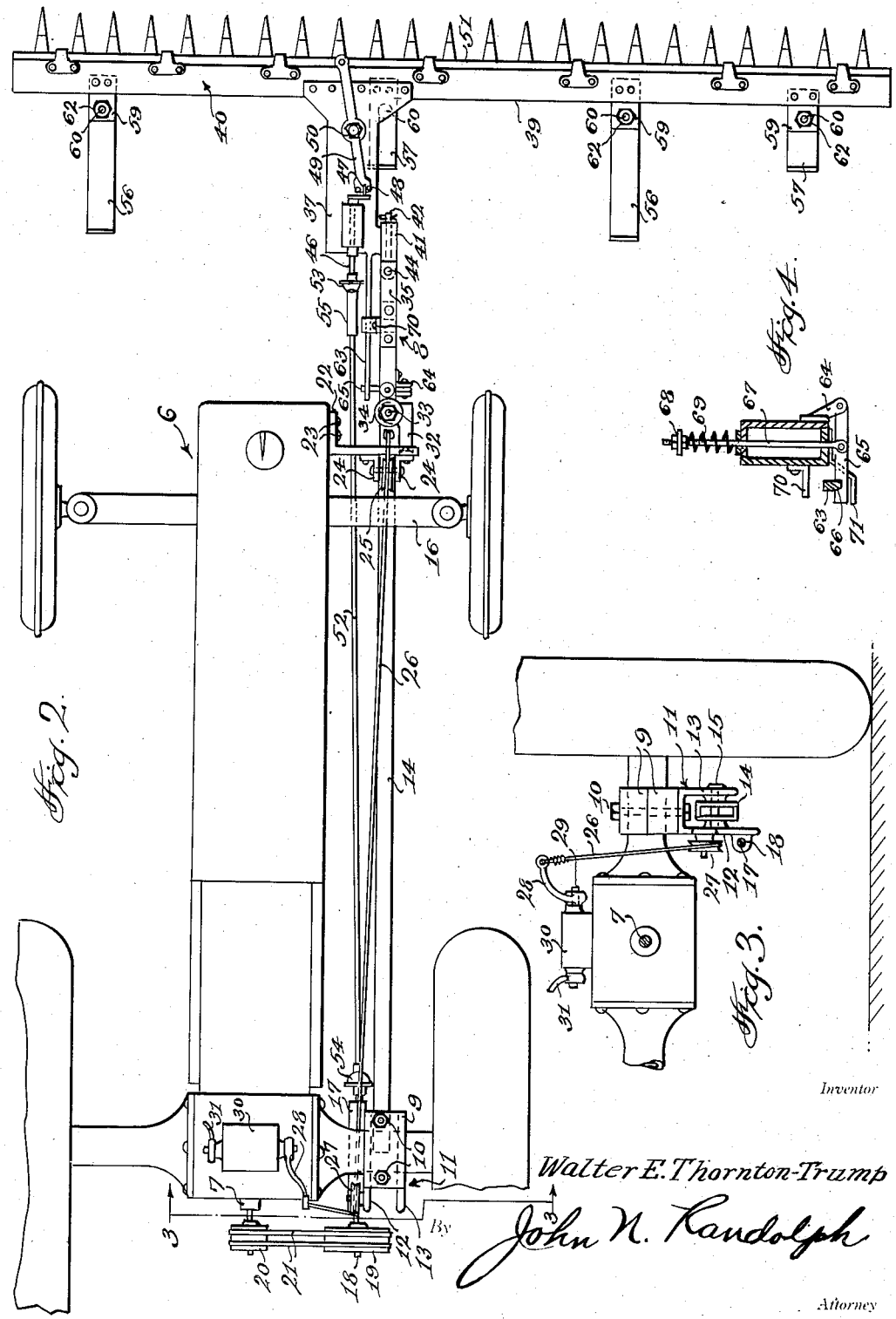
Inventor
Walter E. Thornton-Trump
By John N. Randolph
Attorney Patented Nov. 20, 1951

2,575,369

UNITED STATES PATENT OFFICE 2,575,369

TRACTOR MOUNTED RECIPROCATING MOWER

Walter E. Thornton-Trump, Oliver, British Columbia, Canada

Application December 29, 1948, Serial No. 67,799

5 Claims. (Cl. 56—25)

1

This invention relates to a novel mower adapted to function as an attachment for a conventional tractor and to be driven by the power take-off shaft thereof to enable the sickle knife of the cutter bar to be reciprocated at any desired speed irrespective of the speed of movement of the tractor.

Conventional mowers which are usually supported behind or at a side of a tractor or other prime mover have proven very unsatisfactory for mowing in orchards because of their lack of maneuverability, the poor visibility afforded the operator, the necessity for the operator to dodge branches, difficulty of attachment and because the over-all implement is too wide for such work and the wheels of the prime mover usually trample the grass or other growth before it is mowed. Accordingly, it is a primary object of the present invention to provide a mower of a radically different type and mounting which will overcome all of the aforementioned disadvantages and which particularly adapts itself for use in mowing grass and other growths in orchards and by means of which it is possible to cut close to tree trunks and to swing around tree trunks so that the growth between trees of a row can be readily cut.

Another object of the invention is to provide a mower which will cut in advance of the tractor or other prime mover so that the grass or other vegetation will be cut ahead of the wheels of the tractor.

Another object of the invention is to provide an attachment which is so constructed that when the sickle knife and cutter bar are disposed for cutting beneath the branches of a row of trees and between the tree trunks, the tractor or prime mover will be positioned between adjacent rows of trees and substantially equally spaced from such rows so that the operator will not be required to dodge the tree branches.

A further object of the invention is to provide a mower having a swivelly supported cutter bar which will readily ride the contours of the ground regardless of the position of the prime mover or tractor and which is equipped with a safety trip mechanism to release the cutter bar to permit one end thereof to swing inwardly and rearwardly toward the tractor in the event that the cutter bar strikes a tree trunk or other obstruction.

A further object of the invention is to provide a mower having adjustable cutter bar supporting shoes for supporting the cutter bar and which will ride over rough ground and ditches without permitting the cutting teeth to cut through dirt.

2

A further object of the invention is to provide a mower capable of being elevated to substantially a horizontal position and at a sufficient level above the ground so that the mower can be readily transported at a level where it will not execute a cutting operation and yet be disposed substantially below the level of tree branches.

Various other objects and advantages of the invention will hereinafter become more fully apparent from the following description of the drawings, illustrating a presently preferred embodiment thereof, and wherein:

Figure 1 is a side elevational view showing the mower attached to a conventional tractor and driven by the power take-off shaft thereof;

Figure 2 is a top plan view of the mower in an operative position;

Figure 3 is a fragmentary cross sectional view taken substantially along a plane as indicated by the line 3—3 of Figure 2;

Figure 4 is a cross sectional view taken substantially along a plane as indicated by the line 4—4 of Figure 1, and Figure 5 is a fragmentary top plan view showing the safety trip mechanism released.

Referring more specifically to the drawings, the numeral 6 designates generally a conventional tractor the front steering wheels of which are supported on an arch-shaped front axle and which tractor is provided with a rearwardly extending power take-off shaft 7.

The orchard mower, designated generally 8, which is adapted for mounting as an attachment on the tractor 6 includes a box or block formed of sections 9 which are clamped by fastenings 10 to a portion of the rear axle housing of the tractor 6 adjacent one of its rear wheels. The intermediate or bight portion of a hanger bracket 11, as best illustrated in Figure 3, is disposed against the underside of the bottom box section 9 and is secured thereto by the fastenings 10 and is provided with depending laterally spaced arms 12 and 13 having corresponding internal enlargements between which is disposed one end of an elongated beam 14 which is pivotally mounted on the tractor 6 by a pivot pin 15 which extends therethrough and through said arms 12 and 13 including the enlargements thereof. The beam 14 which is preferably of hollow rectangular shape in cross section extends forwardly from the rear axle housing to beyond the forward end of the tractor 6 and is disposed beneath the intermediate, upper arch portion of the front axle of said tractor, designated 16.

The hanger arm 12 which is disposed innermost with respect to the longitudinal center of the tractor 6, is provided on the side thereof remote to the hanger arm 13 with an elongated bearing 17 which extends longitudinally of the tractor 6 and in which is journaled a countershaft 18 having a pulley 19 secured to its rear end and rearwardly of the bearing 17. A pulley 20 is secured to the power take-off shaft 7 and said pulleys 19 and 20 are each provided with a pair of V-grooves for receiving a pair of endless belts 21 of V-shaped cross section by which the countershaft 18 is driven by the power take-off shaft 7.

An angle bracket 22 is secured by detachable fastenings 23 to a side of the tractor 6 adjacent its forward end and projects laterally therefrom over a portion of the beam 14. A pair of laterally spaced vertically disposed bars 24 of angle iron are secured to the bracket 22 and said bars 24 extend upwardly and downwardly therefrom and the lower portions thereof provide a guide in which the beam 14 is vertically swingable and which prevents lateral movement of said beam relatively to the tractor 6. A pulley 25 is journaled between the bars 24 above the bracket 22 and over which is trained a cable or flexible member 26 which is fastened at one end thereof by an eye screw or the like 27 to the beam 14, adjacent its forward end. The cable 26 extends rearwardly from the pulley 25 under a pulley 27 which is journaled on the bracket arm 12 above the bearing 17 and said cable 26 extends upwardly from the pulley 27 and has its opposite end fastened to a lever arm 28 which is fixed to one end of a shaft 29 which is journaled in a bearing 30, mounted on the upper side of the differential of the tractor 6. A manually or otherwise actuated lever 31, only a portion of which is illustrated in the drawings, is fixed to the opposite end of the shaft 29 and extends upwardly and forwardly therefrom and is conveniently positioned to be actuated by the operator of the tractor 6 for turning the shaft 29 and lever 28 in a clockwise direction, as seen in Figure 1, for exerting a pull on the last mentioned rear end of the cable 26 for raising the beam 14 from its full line to its dotted line position of Figure 1. Obviously, suitable latch means, not shown, may be provided for the lever 31 for retaining said lever, the shaft 29 and lever 28 in various positions to which said parts are movable.

A bracket 32 is fastened to a portion of one of the uprights 24 to provide a guide for slidably receiving a rod 33 which is pivotally connected at its lower end to the beam 14. A spring 33a bears on the guide 32 and is disposed on the upper part of the rod 33 and seats with its upper end against an adjustable stop 34 on the upper part of the rod 33, by which the upward pull exerted on the beam 14 by the expansion spring 33a through the rod 33 can be varied.

The forward end of the beam 14 has a bar 35 secured to each of its upper and lower edges and said bars 35 project forwardly therefrom and are bent upwardly slightly so that when the beam 14 is in its normal lowered position, as illustrated in full lines of Figure 1, the bars 35 will be disposed substantially parallel to the ground, as indicated at 36 in Figure 1. A cutter mounting plate 37 is provided with a laterally enlarged forward end which is secured by fastenings 38 to the rear edge portion of a cutter bar 39 of a conventional type reciprocating cutter 40. The mounting plate 37, adjacent its rear end, is laterally enlarged and provided with a longitudinally extending bearing 41 in which is journaled a pin 42 which projects transversely from the lower portion of a sleeve 43. The sleeve 43 is disposed between the bars 35 and swivelly connected thereto by a pin 44 which extends longitudinally through said sleeve and through openings in the forward end portions of the bars 35 whereby the reciprocating cutter 40 is supported by the mounting plate 37 on the beam 14 for oscillating motion in a vertical plane relatively to the beam 14 on the pin 42 and for oscillating motion in a horizontal plane relatively to said beam on the pin 44.

The mounting plate 37 has on its upper side a longitudinally extending bearing 45 in which is journaled a shaft 46 having a crank or eccentric 47 on its forward end which loosely engages between lugs 48 on the rear end of a lever 49 which is swingably mounted on the plate 37 intermediate of its ends by a pin 50 for swinging movement in a plane substantially parallel to the plate 37 and cutter 40. The forward end of the lever 50 is pivotally connected to the reciprocating sickle knife 51 of the cutter 40. The lever 49 and shaft 46 provide a conventional means for converting a rotary motion into a reciprocating motion and it will be readily apparent that when the shaft 46 is revolved the lever 49 will be oscillated for reciprocating the sickle knife 51 back and forth longitudinally on the cutter bar 39 in a conventional manner. Obviously, other means may be utilized for converting a rotary motion of the shaft 46 into the reciprocating motion of the sickle knife 51.

The rear end of the shaft 46 is connected to the forward end of a drive shaft 52 by a universal joint 53. The drive shaft 52 extends rearwardly from the universal joint 53 along one side of the beam 14 and is connected at its rear end by a universal joint 54 to the forward end of the countershaft 18. The drive shaft 52 is provided with splined telescoping sections as seen at 55 to permit the mounting plate 37 and cutter 40 to swing from its normal position of Figure 2 to and beyond its position of Figure 5 and also to allow for the change in length of the drive shaft 52 as the cutter bar is elevated.

The reciprocating cutter 40 is normally supported by two or more relatively long shoes 56 and two or more relatively short shoes 57 which are fastened to the underside of the cutter bar 39 adjacent its rear edge on pivots 58, as seen in Figure 1. The shoes 56 and 57 extend rearwardly from the cutter bar 39 and are longitudinally bowed in a downward direction. A plate 59 is associated with each shoe 56 and 57 and is fastened to the cutter bar 39 and projects rearwardly therefrom. A bolt 60 is pivoted to and extends upwardly from each shoe 56 and 57 reciprocally through an opening in the plate 59 disposed above said shoe and carries an expansion coiled spring 61 which bears against the shoe and plate for urging the shoe downwardly relatively to the plate. The upper ends of the bolts 60 are threaded each to receive a nut 62 which is adjustable thereon and engages the upper side of the associated plate 59 for limiting the extent that the shoes 56 and 57 can be biased downwardly by the springs 61. The shoes 56 and 57 are each adapted to contact the ground 36, as best illustrated in Figure 1, when the mower 8 is disposed in an operative position for supporting the reciprocating cutter 40 in substantially a horizontal plane as illustrated in full lines in Figure 1 and for additionally supporting the beam 14 in its downwardly and forwardly inclined position. The spring 33a additionally assists in yieldably supporting said parts to cut down the drag of the shoes 56 and 57 on the ground 36 and provides a counter spring means for reducing the amount of pull required to be exerted on the cable 26 for raising said parts to their inoperative positions as seen in dotted lines in Figure 1. It will be noted that the short and long shoes 56 and 57 which are alternately arranged, contact the ground level 36 at differently spaced points rearwardly of the cutter 40, for a purpose which will hereinafter become apparent. The mower 8 is provided with a safety trip mechanism including a bar 63 which is suitably secured to or formed integral with the plate 37 and which extends rearwardly therefrom along the inner side of the beam 14. As best seen in Figure 4, a bracket 64 is fastened to and projects downwardly and outwardly from the opposite, outer side of the bear 14. A latch bar 65 is pivotally conected at one end thereof to the lower end of the bracket 64 and extends transversely beneath the beam 14 and is provided adjacent its free end with an upwardly opening notch 66 to normally receive a portion of the bar 63. As seen in Figure 4, the outer side of the notch 66 and the outer side of the lower edge portion of the bar 63 are inclined outwardly and upwardly to form inter-engaging cam surfaces so that when a force is exerted on the bar 63 tending to cause it to move laterally away from the bear 14, as seen in Figure 4, said bar will normally tend to displace the free end of the latch bar 65 downwardly to disengage the latch bar from the bar 63. A rod 67 is pivotally connected to the intermediate portion of the latch bar 65 and extends upwardly therefrom reciprocally through the beam 14 and has an adjustably disposed nut and washer unit 68 on its upper end portion forming a stop for an expansion coiled spring 69 which is mounted on the upper portion of the rod 67 and the lower end of which bears on the upper side of the beam 14 for urging the latch bar 65 to normally swing upwardly and for retaiinng the notch 66 thereof in engagement with the bar 63 when the plate 37 and cutter 40 oscillate on the pin 42 in passing over irregular or uneven ground and so that the trip mechanism as illustrated in Figure 4 will not be thereby released to permit the cutter 40 to swing from its position of Figure 2 to and beyond its position of Figure 5. Stop 68 is adjustable to vary the tension of spring 69.

From the foregoing it will be readily apparent that the mower 8 in its dotted line position of Figure 1 can be conveniently transported at a sufficient level above the ground so that the vegetation will not be cut thereby should the power take-off shaft be driven and yet can be disposed at a sufficiently low level so that it will not strike overhanging tree branches or the like. As seen in Figure 2, one end of the cutter 40 is disposed directly in front of its prime mover or tractor 6 whereas the opposite end of said cutter extends laterally to substantially beyond one side of the tractor 6. Accordingly, with the mower 8 in its operative position of Figure 1, the tractor 6 may be driven through an orchard, not shown, between parallel rows of trees and with the tractor disposed substantially intermediate of the tree rows so that the tractor and tractor operator will not be engaged by the tree branches. When the mower is thus operated, one end of the reciprocating cutter 40 will mow the grass or vegetation directly in front of the tractor 6 while the opposite end of the cutter 40 will extend laterally to the right, looking from rear to front of the tractor for mowing the vegetation beneath one row of the trees and between the tree trunks. With the mower 8 disposed with its cutter 40 in advance of the tractor 6, a very slight turning movement of the steering wheel of the tractor is sufficient to displace the laterally offset end of the cutter 40 transversely of the normal direction of travel of the mower for guiding said end around tree trunks. With the mower thus positioned, it is possible for the laterally offset end thereof to cut directly up to a corner after which the tractor can be backed off thus enabling the mower 8 to cut in inaccessible places ordinarily missed by conventional mowers so that the mower 8 provides for a much greater maneuverabiilty than is possible with the usual mower and is furthermore capable of moving through any opening or along any strip of a width as great as the width of the cutter 40.

The swivel joint 41, 42 between the supporting beam 14 and the cutter 40 permits the latter to oscillate relatively to the beam to follow the contour of the ground over which the cutter is moving regardless of the position of the tractor wheels. Nuts 62 on the bolts 60 are adjustable for raising or lowering the cutter 40 relatively to the ground level for varying the height of the cutting operation. The long and short shoes 56 and 57 provide a support for the cutter which will readily ride over ditches, furrows or humps and with the shoes of different lengths bridging ditches to prevent the cutter bar and sickle knife teeth from digging into and cutting through dirt.

The uprights 24 provide braces to absorb any lateral thrust on the beam 14 and for guiding the beam in its vertical movement. In the event that the laterally offset end of the cutter 40 should strike a tree trunk or other obstruction, the torque thereby exerted thereon will cause the cutter 40 and plate 37 to swing horizontally in a clockwise direction as seen in Figures 2 and 5 on its pivot 44 for camming the trip bar 63 out of engagement with the notch 66 of the latch bar 65 to permit the cutter to swing relatively to the tractor 6 to thereby prevent damage thereto.

The beam 14 is provided with inwardly extending upper and lower stops 70 and 71, respectively (Figure 4), between which the latch bar 63 is disposed and which limit the extent that the cutter bar can rock vertically on the pin 42 when in an elevated position so that the longer, heavier end of the cutter will not drag along the ground.

The speed at which the cutter 40 is driven is not dependent upon the speed of translational movement of the tractor 6 so that the cutter can be driven at a relatively fast speed relatively to the speed of movement of the tractor by driving the tractor in first or second gears.

Various modifications and changes are contemplated and may obviously be resorted to, without departing from the spirit or scope of the invention as hereinafter defined by the appended claims.

I claim as my invention:

1. A mower adapted to be demountably supported on a vehicle and actuated by a power take-off shaft of a prime mover thereof, said mower including a beam extending longitudinally of the vehicle and pivotally supported at its rear end adjacent the rear end of the vehicle for vertical swinging movement, a reciprocating cutter supported by the forward end of the beam and normally disposed transversely thereof and in advance of the vehicle, driving means adapted to be driven by the power take-off for driving the sickle knife of the reciprocating cutter, and ground engaging shoes yieldably mounted beneath the reciprocating cutter for yieldably supporting said cutter in substantially a horizontal plane and at a predetermined level above the ground, said ground engaging shoes being pivotally connected at their forward ends to the cutter in longitudinally spaced relationship to one another and extending rearwardly therefrom, each of said shoes being longitudinally and downwardly bowed, and said ground engaging shoes including alternate shoes of different lengths having portions for engaging the ground disposed different distances behind the reciprocating cutter.

2. A mower adapted to be demountably supported on a vehicle and actuated by a power take-off shaft of a prime mover thereof, said mower including a beam extending longitudinally of the vehicle and pivotally supported at its rear end adjacent the rear end of the vehicle for vertical swinging movement, a reciprocating cutter supported by the forward end of the beam and normally disposed transversely thereof and in advance of the vehicle, driving means adapted to be driven by the power take-off shaft for driving the sickle knife of the reciprocating cutter, and ground engaging shoes yieldably mounted beneath the reciproctaing cutter for yieldably supporting said cutter in substantially a horizontal plane and at a predetermined level above the ground, said reciprocating cutter being supported intermediate of its ends on the beam and having one end disposed directly in front of the vehicle and an opposite end extending laterally to one side of the vehicle.

3. A mower adapted to be demountably supported on a vehicle and actuated by a power take-off shaft of a prime mover thereof, said mower including a beam extending longitudinally of the vehicle and pivotally supported at its rear end adjacent the rear end of the vehicle for vertical swinging movement, a reciprocating cutter supported by the forward end of the beam and normally disposed transversely thereof and in advance of the vehicle, driving means adapted to be driven by the power take-off shaft for driving the sickle knife of the reciprocating cutter, and ground engaging shoes yieldably mounted beneath the reciprocating cutter for yieldably supporting said cutter in substantially a horizontal plane and at a predetermined level above the ground, and connecting means between the reciprocating cutter and beam including a swivel joint to permit said cutter to oscillate vertically relatively to the beam and a second swivel joint disposed at a right angle to the first mentioned swivel joint to permit the cutter to swing in substantially a horizontal plane relatively to the beam.

4. A mower adapted to be demountably supported on a vehicle and actuated by a power take-off shaft of a prime mover thereof, said mower including a beam extending longitudinally of the vehicle and pivotally supported at its rear end adjacent the rear end of the vehicle for vertical swinging movement, a reciprocating cutter supported by the forward end of the beam and normally disposed transversely thereof and in advance of the vehicle, driving means adapted to be driven by the power take-off shaft for driving the sickle knife of the reciprocating cutter, and ground engaging shoes yieldably mounted beneath the reciprocating cutter for yieldably supporting said cutter in substantially a horizontal plane and at a predetermined level above the ground, connecting means between the reciprocating cutter and beam including a swivel joint to permit said cutter to oscillate vertically relatively to the beam and a second swivel joint disposed at a right angle to the first mentioned swivel joint to permit the cutter to swing in substantially a horizontal plane relatively to the beam, and a trip mechanism for normally latching the cutter to prevent horizontal swinging movement thereof on the last mentioned swivel joint, said trip mechanism including cam portions to be cammed out of latching engagement by a torsional force exerted in one direction on the cutter.

5. A mower adapted to be demountably supported on a vehicle and actuated by a power take-off shaft of a prime mover thereof, said mower including a beam extending longitudinally of the vehicle and pivotally supported at its rear end adjacent the rear end of the vehicle for vertical swinging movement, a reciprocating cutter supported by the forward end of the beam and normally disposed transversely thereof and in advance of the vehicle, driving means adapted to be driven by the power take-off shaft for driving the sickle knife of the reciprocating cutter, and ground engaging shoes yieldably mounted beneath the reciprocating cutter for yieldably supporting said cutter in substantially a horizontal plane and at a predetermined level above the ground, said beam being disposed adjacent one side of the vehicle, and said reciprocating cutter being connected intermediate of its ends to the beam.

WALTER E. THORNTON-TRUMP.

REFERENCES CITED

The following references are of record in the file of this patent:

UNITED STATES PATENTS

| Number | Name | Date |
|---|---|---|
| 957,660 | Delano | May 10, 1910 |
| 1,109,916 | Friday | Sept. 8, 1914 |
| 1,202,084 | Merkel | Oct. 24, 1916 |
| 1,559,429 | Hirai | Oct. 27, 1925 |
| 2,120,671 | Jensen et al. | June 14, 1938 |
| 2,263,886 | Munro | Nov. 25, 1941 |